(12) United States Patent
Providenza

(10) Patent No.: US 6,678,774 B2
(45) Date of Patent: *Jan. 13, 2004

(54) SHARED RESOURCE ARBITRATION METHOD AND APPARATUS

(75) Inventor: John R. Providenza, Beaverton, OR (US)

(73) Assignee: Koninklijke Philips Electronics N.V., Eindhoven (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/464,248

(22) Filed: Dec. 16, 1999

(65) Prior Publication Data

US 2003/0110318 A1 Jun. 12, 2003

(51) Int. Cl.[7] .............................................. G06F 13/00
(52) U.S. Cl. .................... 710/240; 710/14; 710/22; 710/28; 710/40; 710/107; 710/111; 710/310
(58) Field of Search .............................. 710/14, 22, 28, 710/40, 107, 111, 240, 310

(56) References Cited

U.S. PATENT DOCUMENTS

| 4,787,033 | A | * | 11/1988 | Bomba et al. ............... 710/116 |
|---|---|---|---|---|
| 5,148,545 | A | * | 9/1992 | Herbst et al. ............... 710/240 |
| 5,303,382 | A | | 4/1994 | Buch et al. .................. 395/725 |
| 5,649,206 | A | | 7/1997 | Allen ........................ 395/729 |
| 5,664,121 | A | * | 9/1997 | Cerauskis .................... 710/113 |
| 5,729,702 | A | | 3/1998 | Creedon et al. ............. 395/291 |
| 5,987,549 | A | * | 11/1999 | Hagersten et al. .......... 710/107 |
| 6,311,249 | B1 | * | 10/2001 | Min et al. .................... 710/711 |
| 6,349,297 | B1 | * | 2/2002 | Shaw et al. .................... 707/4 |

FOREIGN PATENT DOCUMENTS

WO    WO9635173    11/1996

* cited by examiner

*Primary Examiner*—Jeffrey Gaffin
*Assistant Examiner*—Mohammad O. Farooq

(57) ABSTRACT

An arbiter apparatus for selecting an agent to use a shared resource such as memory. A normal round robin list is utilized in the selection process during boot operation. During the initialization process, a dynamic list is generated in accordance with system requirements. The dynamic list selection process may take any of several forms. In a first mode, it may select only priority listed agents, any one of which may be repeated during a given cycle of selection. In a second mode, it may select a designated buddy agent when the selected priority agent is idle. In either mode, and in accordance with a set of priority selection rules, one or more lowest priority default agents may be given access when the designated higher priority agents for a given list entry slot are idle.

13 Claims, 3 Drawing Sheets

| ENTRY 0 | AGENT 1 |
|---|---|
| ENTRY 1 | AGENT 2 |
| ENTRY 2 | AGENT 3 |
| ENTRY 3 | AGENT 4 |
| ENTRY 4 | AGENT 5 |
| ENTRY 5 | AGENT 6 |
| ENTRY 6 | AGENT 7 |
| ENTRY 7 | AGENT 8 |

FIG. 4

|  | PRIORITY AGENTS | BUDDY AGENTS |
|---|---|---|
| ENTRY 0 | AGENT 1 | AGENT 4 |
| ENTRY 1 | AGENT 2 | AGENT 4 |
| ENTRY 2 | AGENT 3 | AGENT 5 |
| ENTRY 3 | AGENT 1 | AGENT 4 |
| ENTRY 4 | AGENT 2 | AGENT 4 |
| ENTRY 5 | AGENT 3 | AGENT 5 |
| ENTRY 6 | AGENT 1 | AGENT 4 |
| ENTRY 7 | AGENT 2 | AGENT 4 |
| ENTRY 8 | AGENT 3 | AGENT 5 |

FIG. 5

SHARED RESOURCE ARBITRATION METHOD AND APPARATUS

TECHNICAL FIELD

The present invention relates in general to shared resource access arbitration and in particular to methods and systems for providing flexibility to match the needs of a plurality of agents or requesters, each attempting to use a shared and common resource, such as memory in a data processing system.

BACKGROUND

An arbiter controls the granting of access to a shared resource, such as memory or a communication bus, among a number of agents or requesters. In the case of a memory resource, such requesters could include central processing units (CPUs), screen refresh DMA (direct memory access) processor, 3D drawing block DMA processor, 2D drawing block DMA processor, USB Interface, Ethernet Interface, and so forth. Each of these units contend for the common resource, but the requirements of each agent or requestor may change in accordance with the type of data processing being accomplished at any given time.

Known current methods for performing the arbitration task typically use complicated and inflexible scheduling techniques or else use extremely simple schemes that do not adapt well to changing system load. Examples of such techniques are designated in the art as "round robin," fixed priority, multilevel priority, requester priorities that change based on the previous winner of the arbitrated resource, and so forth. One complicated arbitration system has dynamically switched between different ones of some of the aforementioned arbitration schemes depending upon system requirements at a given time.

It would be desirable to have a simple arbitration scheme that provides inherent flexibility to changing system requirements for a given set of agents or resource requesters while still allowing the addition of further agents where necessary to perform newly assigned tasks.

SUMMARY OF THE INVENTION

The present invention comprises a list driven arbitration method that can operate in at least two modes. In a boot mode, a list is used comprising all possible requesters and the arbiter uses a simple technique, such as "round robin," to allocate the shared resource during the system initialization process. After initialization, the different or second list used specifies specific agents that will be allowed to access the shared resource. This second list, which typically will designate fewer unique agents than the boot list, can be dynamically changed, both as to agents named and as to interpretation of the list to allow great flexibility in accordance with system load requirements.

BRIEF DESCRIPTION OF THE DRAWINGS

For a more complete understanding of the present invention, and its advantages, reference will now be made in the following Detailed Description to the accompanying drawings, in which:

FIG. 4 is an example of a static or boot list utilized in an embodiment of the invention; and FIG. 5 is an example of a dynamic or normal operation list used in an embodiment of the invention.

DETAILED DESCRIPTION

Figures 1, 2:
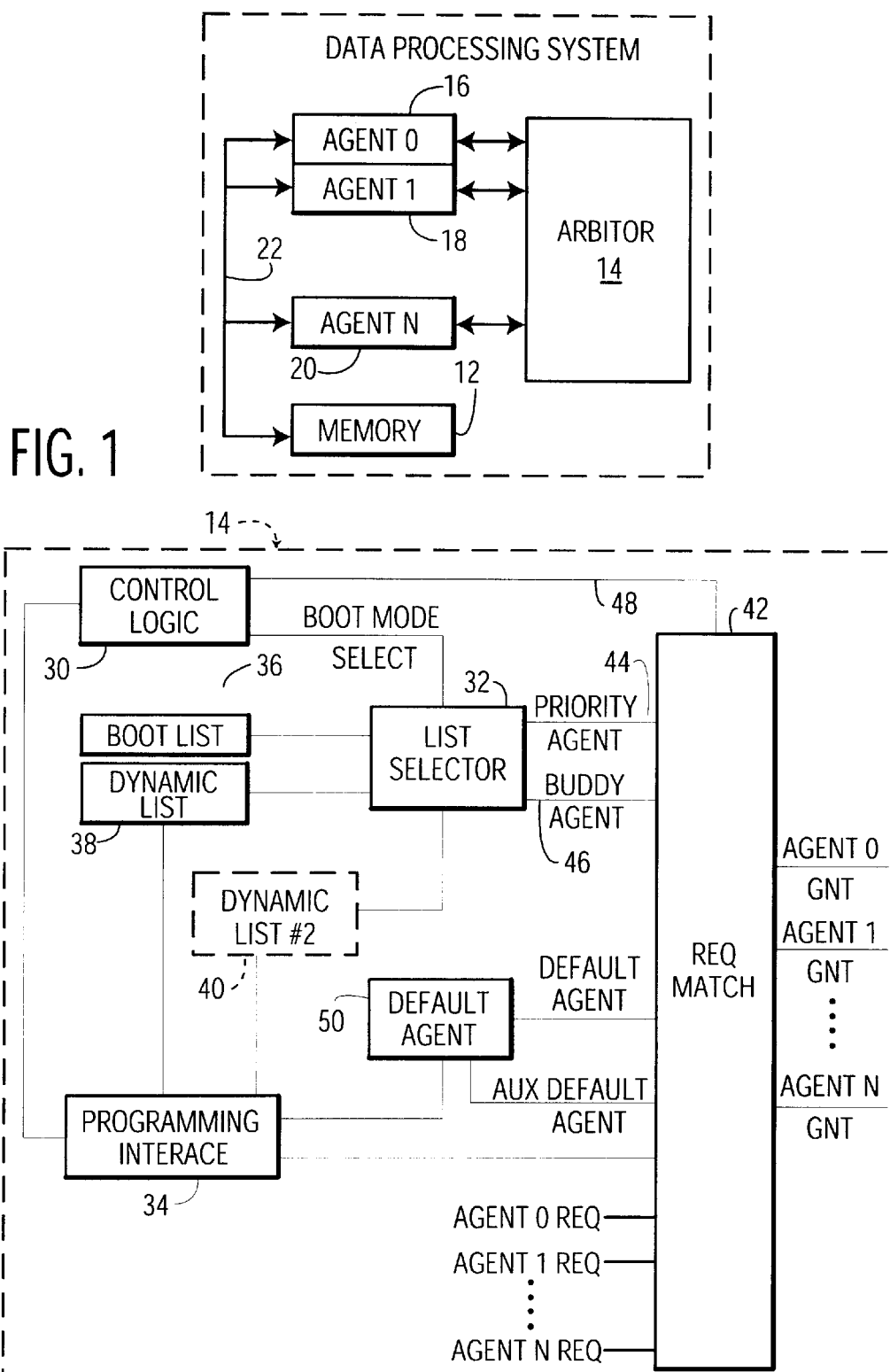
FIG. 1 represents a data processing system incorporating an arbiter utilized in an embodiment of the invention.
FIG. 2 is a block diagram of an arbitration system incorporating an embodiment of the invention.

Referring to FIG. 1, a block 10 represents a data processing system including one or more CPUs, a monitor, one or more disk drives and so forth (none of which are specifically shown as they are well-known in the art). A shared memory resource block 12, within block 10, is specifically shown along with an arbiter 14. Agents or requesters for resource 12 are illustrated as agents 0, 1 and N and are further designated as 16, 18 and 20, respectively. Each of the agents are connected to arbiter 14 by request and grant links and are shown connected to memory 12 by a common bus 22.

In FIG. 2, the arbiter 14 is shown in more detail as comprising a control logic block 30 supplying signals to a list selector 32 and to a programming interface 34. The list selector 32 is connected to a boot or static list 36, a dynamic or normal operation list 38 and a dash line block 40 representing an optional second dynamic list as may be desirable in some preferred embodiments of the present invention. List selector 32 is also connected to a request match block 42 for supplying thereto priority and buddy agent designators on leads 44 and 46, respectively. Typically, the priority agent designator supplied on lead 44 would be obtained from any of the lists 36, 38 and 40 as determined by the control logic 30 or the programming interface 34. The buddy agent designator would be obtained from the specific entry access slot of the dynamic list being accessed at that time. The control logic 30 supplies a mode select signal on a lead 48 to the request match block 42 to tell the block 42 which, if any, of the possible alternate agents to pick if the higher priority agent is idle. The programming interface block 34 also supplies signals to a default agent block 50, as well as to block 42. As further shown, request match block 42 has request inputs from each of the agents and grant outputs to each of the agents.

Figure 3:
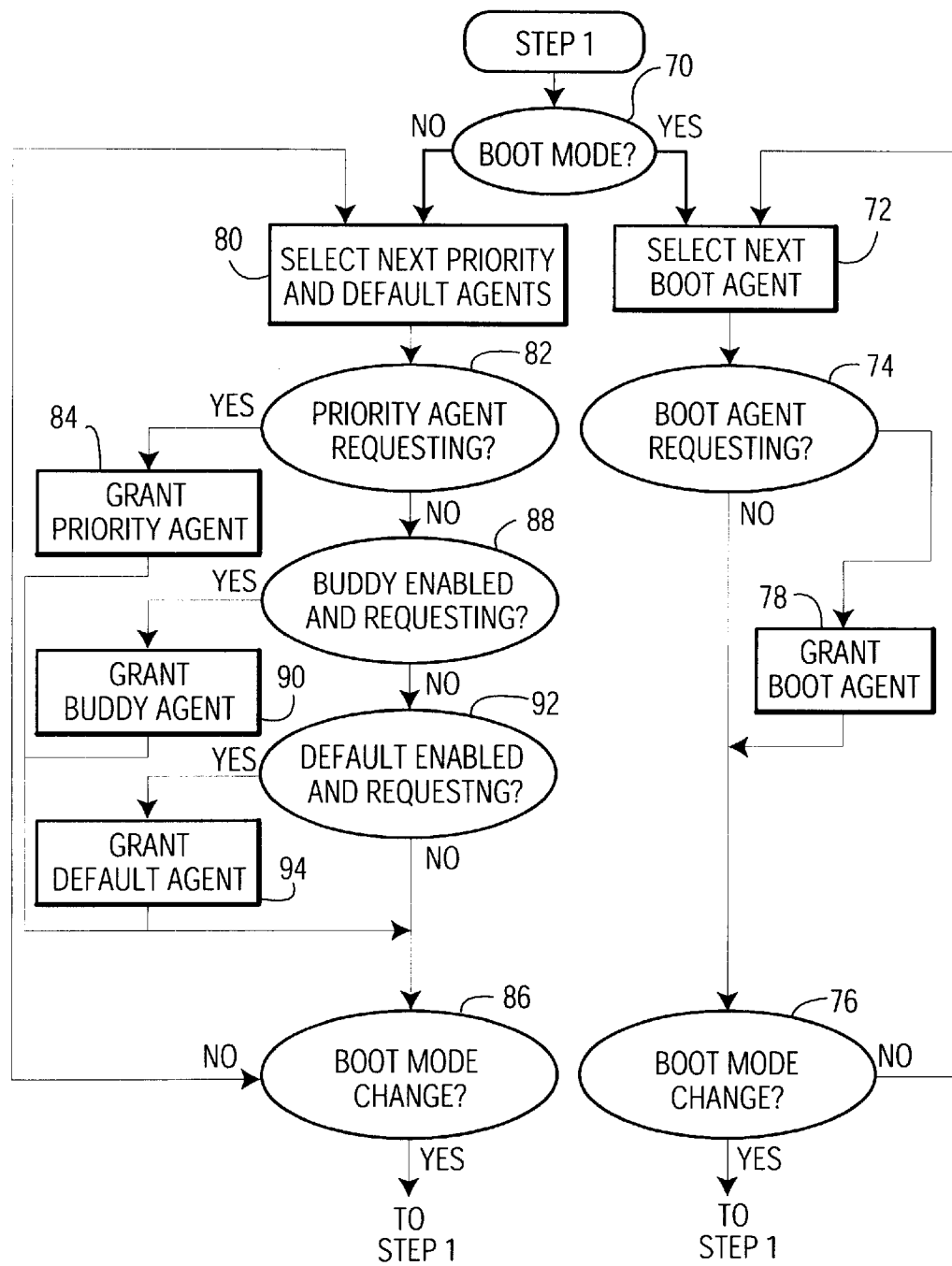
FIG. 3 is a flow diagram used in a data processing system incorporating an embodiment of the invention.

The flow diagram of FIG. 3 starts with a boot mode decision block 70. If the system is still being initialized, the process proceeds to a select next boot agent block 72 from a boot list, such as shown in FIG. 4. Each of the entries of FIG. 4 are sequentially accessed in a "round robin" procedure. In other words, when each of the agents from first to last entry on the list have been checked for access requests in sequential order, the process returns to the first item on the list. A check is made in a decision block 74 to ascertain whether or not that agent has requested access to the shared resource 12. If not, the process proceeds to decision block 76 to determine whether or not initialization is complete and the boot mode has ended. If it is determined in block 74 that the selected agent has requested access, it is granted the access in block 78. When the selected agent has finished with memory 12, the process continues to block 76. If it is determined in block 76 that the system is still in the boot mode, the process returns to block 72 to select the next boot agent in the list. On the other hand, if it is determined in block 76 that initialization is complete, the process returns to the boot mode block 70 and then to a select next priority agent block 80. The process in decision block 82 checks to see if the selected priority agent for that entry has requested access to resource 12.

Priority agents and associated buddy agents are set forth in an example dynamic or normal list in FIG. 5. It may be noted that, as shown, there is a repeat of agents 1, 2 and 3 for each of 9 entries. Agents 4 and 5 in this example have less priority and are thus granted access only when one of the priority agents is temporarily idle.

Returning to FIG. 3, it will be noted that if the selected priority agent has requested access, it is granted in block 84.

When the agent has completed access, a decision block 86 is entered in one preferred embodiment of the invention. If there is no boot mode change, the process returns from block 86 to 80 for selecting the next priority agent from the list of FIG. 5. If there is a boot change, the process returns to block 70.

Referring to FIGS. 1, 3 and 5, if the decision block 82 determines that the selected priority agent has not made a request (i.e., it is temporarily idle), a decision block 88 is entered to determine if the buddy mode is enabled in accordance with the programming interface block 34 of FIG. 1. If the buddy mode is enabled, the listed buddy agent for the selected entry is checked. If the selected entry is 2, according to FIG. 5, the priority agent would be agent 3 and the buddy would be agent 5. If agent 5 has requested access, this request is granted in block 90. When agent 5 has completed access to resource 12, the process then proceeds to block 86.

If the determination in block 88 is NO to either of buddy enablement or to the selected buddy requesting access, the process continues to a decision block 92 where a default enablement is checked along with whether or not the one or more default agents are requesting access. If there is a default enablement, as well as an access request, it will be granted in accordance with block 94 before returning to block 86. If there is either no default enablement or no default agent access request, the process goes from block 92 directly to block 86.

One or more default agents may be enabled. This enabling notification is supplied by programming interface 34 to both the logic 30 and the request block 42. The arbiter 14 of FIG. 2 illustrates the possibility of primary and auxiliary default agents. It will thus be apparent, from the above, that when the arbiter 14 is using the dynamic list for selecting which agent is to be granted access to the resource 12, great flexibility may be provided in accordance with system requirements at the time. In other words, the selections from the dynamic list may be either just the priority agents or it may select a designated buddy agent in instances when the priority agents are temporarily idle. Further, one or more default agents may be allowed access when all higher priority agents are idle at a given access selection time.

From the above, it may be determined that in a linear dynamic mode situation where the buddy agent is not enabled, but two default agents are enabled, the access would be determined by the following table for each entry position of the table in FIG. 5.

| list agent | $1^{st}$ (highest) priority |
|---|---|
| DefaultAgent0 | $2^{nd}$ priority |
| DefaultAgent1 | $3^{rd}$ (lowest) priority (Aux default agent) |

When the buddy mode is used and two default agents are enabled, the following table may be used to determine access for each entry position of the table of FIG. 5.

| Primary agent | $1^{st}$ (highest) priority |
|---|---|
| Buddy agent | $2^{nd}$ priority |
| DefaultAgent0 | $3^{rd}$ priority |
| DefaultAgent1 | $4^{th}$ (lowest) priority |

The arbitration method can operate in several different modes. During initialization, each of the agents that may need access to the shared resource are given access in accordance with a fixed or static list as shown in FIG. 4. During the initialization process, many of these agents will not require access to the given resource and thus the selector will cycle through the list many times while giving access to the shared resource to only a few of the many listed agents. When initialization is complete, this change is detected in the decision block 76 and the list selector 32 stops selecting the static list of block 36 and changes to the dynamic list of 38, an example of which is shown in FIG. 5.

In the example of FIG. 5, Agents 1, 2, and 3 are shown as "priority" agents that must be guaranteed access to memory. Agents 4 and 5 are lower priority agents that are only granted access to memory if the priority agents do not require access. In such a situation, Agent 6 may be designated in block 50 as a default agent that is very low priority and is only granted access if no primary/buddy agent pair needs to access memory.

The arbiter of FIG. 2 may have one or more default agents included in the list of FIG. 5 (although not presently shown), which would eliminate the need for block 50 in FIG. 2. The list selector 32 would additionally have default agent outputs when one or more defaults were enabled in accordance with the programming interface 34 and system requirements.

The flow diagram of FIG. 3 allows for the arbiter to be returned to the boot mode when system conditions are altered and the dynamic list needs to be modified. This change in boot mode condition is detected in decision block 86 of FIG. 3. When the dynamic list modification is complete, this action or step is detected in block 70 and the arbiter (and, accordingly, the list selector 32) returns to assigning access on the basis of the newly modified dynamic list 38

A further preferred embodiment of the invention is use of a second dynamic list (shown in FIG. 2 as dash line block 40) to help with mode changes. With two dynamic lists, the presently unused or non-selected list can be changed while the other list is being used. Once the non-selected list is correctly modified or updated, the arbiter can be told to 'switch lists.' At a graceful or timely point in the selection process, the arbiter changes lists and the previously used list is now available to be modified while the newly selected list is being used for arbitration. This provides a "ping-pong" type operation (i.e., one is used while the other is changed).

Typically, the list of FIG. 5 will allow for more entries than there are agents. In this manner, it is possible to allocate more access to the shared resource to a given agent by entering that agent in the list more than once. As shown, FIG. 5 illustrates 9 entries. If the buddy mode is not enabled, agent 1 could be listed for every other of the first 8 entries (1, 3, 5, 7) with agents 2 and 3 entered in the intermediate entries 2, 4, 6, and 8. In such a situation, entry 9 may be left blank, or a non-existent agent could be listed and the flow diagram of FIG. 3 would determine that there was no request for that entry. However, agent 1 would be allowed access 50% of the time.

The list may either be a fixed length as shown, or may contain an end of list designation to specify the last valid entry in the list, whereby the flow diagram returns to the beginning of the list upon detecting the stated end of list designation.

Although the invention has been described with reference to specific embodiments, these descriptions should not be construed in a limiting sense. Various modifications and rearrangements of the disclosed embodiments, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. An arbitration protocol method of selecting current agent to use a shared resource, comprising the steps of:

operating in a first comprehensive mode from a stored list sequentially accessed by an arbiter in selecting the next access slot user of a shared resource while initializing an arbitration system; and operating in a second selective mode during normal operation from a dynamically generated agent list sequentially accessed by the arbiter in selecting the next access slot user of the shared resource;

forming an agent list for use is said second mode wherein the list contains priority agents;

normally allowing access to said shared resource by said priority agent; and granting access to a designated default agent when the currently selected priority agent does not require access to the shared resource;

donating the access to an alternate buddy agent designated by the designated default agent when the designated default agent does not require access to the shared resource.

2. The method of claim 1, comprising the additional step of:

forming an agent list having more entries than there are unique priority access agents in the list for use in said second mode whereby at least one priority agent in the list has access to the shared resource more than once in an arbitration cycle.

3. The method of claim 1, comprising the additional step of:

operating in the first comprehensive mode from the stored list while changing the format of the dynamically generated agent list that is used in a sequential access manner by the arbitrator in selecting the next access slot user of the shared resource.

4. An arbitration protocol method of selecting a current agent to use a shared resource, comprising the steps of:

operating in a first comprehensive mode from a stored list sequentially accessed by an arbiter in selecting the next access slot user of a shared resource while initializing an arbitration system;

operating in a second selective mode during normal operation from a dynamically generated agent list sequentially accessed by the arbiter in selecting the next access slot user of the shared resource;

forming an agent list for use in said second mode wherein at least one priority agent in the list further designates an alternate buddy agent;

normally allowing access to said shared resource by said priority agent; and donating the access slot to the designated buddy agent when the priority agent is temporarily idle.

5. The method of claim 4, comprising the additional step of:

specifying a default agent for use in said second mode;

granting access to the designated default agent when neither the currently selected priority agent nor the designated buddy agent requires access to the shared resource.

6. An arbitration protocol method of selecting a current agent to use a shared resource, comprising the steps of:

operating in a first comprehensive mode from a stored list sequentially accessed by an arbiter in selecting the next access slot user of a shared resource while initializing an arbitration system;

operating in a second selective mode during normal operation from a dynamically generated agent list sequentially accessed by the arbiter in selecting the next access slot user of the shared resource;

creating both first and second dynamically generated agent lists; and operating from one of said first and second dynamically generated agent lists while changing the format of the other of said first and second dynamically generated agent lists.

7. An arbiter in a data processing system for controlling access to a shared resource, comprising:

a fixed list;

a dynamic list that is created during the initialization process and comprising agents to be allowed access to the shared resource in normal operation; and a selector sequentially accessing said fixed list in selecting the next access slot user of a shared resource while the data processing system is being initialized and accessing the dynamic list in selecting the next access slot user of a shared resource during normal operation, wherein the dynamic list includes both a priority agent and an alternate buddy agent in each access slot and comprising in addition:

a donating selector wherein the slot is donated to the designated buddy agent when the priority agent is temporarily idle.

8. The arbiter of claim 7, comprising in addition:

a default selector whereby access is granted to a designated default agent when higher priority agents listed in the current access slot do not require access to the shared resource.

9. The arbiter of claim 7, wherein the dynamic list includes more entries than there are unique priority access agents in the dynamic list whereby at least one priority agent in the list has access to the shared resource more than once in a complete arbitration cycle.

10. The arbiter of claim 7, comprising in addition:

a dynamic list modifier operational to alter at least one of the priority format and number of unique agents included in the dynamic list; and a selection reverter operational to utilize the fixed list while the format of the dynamic list is being revised.

11. An arbiter in a data processing system for controlling access to a shared resource, comprising:

a fixed list;

a dynamic list that is created during the initialization process and comprising agents to be allowed access to the shared resource in normal operation; and a selector sequentially accessing said fixed list in selecting the next access slot user of a shared resource while the data processing system is being initialized and accessing the dynamic list in selecting the next access slot user of a shared resource during normal operation;

means for altering the number of unique agents listed in the dynamic list when system operational changes are detected.

12. An arbiter in a data processing system for controlling access to a shared resource, comprising:

a fixed list;

a dynamic list that is created during the initialization process and comprising agents to be allowed access to the shared resource in normal operation; and a selector sequentially accessing said fixed list in selecting the next access slot user of a shared resource while the data processing system is being initialized and accessing the dynamic list in selecting the next access slot user of a shared resource during normal operation;

means for altering the interpretation of the agent to be selected in the dynamic list when a priority agent selected is temporarily idle with respect to utilization of said shared resource when system operational changes are detected.

13. An arbiter in a data processing system for controlling access to a shared resource, comprising:

a fixed list;

a dynamic list that is created during the initialization process and comprising agents to be allowed access to the shared resource in normal operation; and a selector sequentially accessing said fixed list in selecting the next access slot user of a shared resource while the data processing system is being initialized and accessing the dynamic list in selecting the next access slot user of a shared resource during normal operation;

a dynamic second list generator;

a selection reverter operational to switch between the use of one or the other of said first and second dynamic lists in accordance with system requirements; and a dynamic list modifier operational to alter at least one of the priority format and number of unique agents included in the dynamic list not presently being used.

* * * * *